US011333577B2

(12) United States Patent
Maekawa et al.

(10) Patent No.: US 11,333,577 B2
(45) Date of Patent: May 17, 2022

(54) METHOD AND DEVICE FOR DIAGNOSING ABNORMALITY IN ROLLING BEARING

(71) Applicant: NSK LTD., Tokyo (JP)

(72) Inventors: Toshimitsu Maekawa, Fujisawa (JP);
Kenichi Shibasaki, Fujisawa (JP);
Takanori Miyasaka, Fujisawa (JP);
Yoshihiro Sato, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/255,905

(22) PCT Filed: Aug. 23, 2019

(86) PCT No.: PCT/JP2019/032983
§ 371 (c)(1),
(2) Date: Dec. 23, 2020

(87) PCT Pub. No.: WO2020/040280
PCT Pub. Date: Feb. 27, 2020

(65) Prior Publication Data
US 2021/0255060 A1 Aug. 19, 2021

(30) Foreign Application Priority Data
Aug. 23, 2018 (JP) .............................. JP2018-156535

(51) Int. Cl.
*G01M 13/045* (2019.01)
*G01L 5/00* (2006.01)
*F16C 19/52* (2006.01)

(52) U.S. Cl.
CPC ......... *G01M 13/045* (2013.01); *F16C 19/527* (2013.01); *G01L 5/0009* (2013.01);
(Continued)

(58) Field of Classification Search
CPC ................ G01M 13/045; G01M 13/04; F16C 19/52–527; F16C 2233/00; G01L 5/0009–0023
See application file for complete search history.

(56) References Cited

U.S. PATENT DOCUMENTS 5,001,931 A * 3/1991 Nishimoto .......... G01M 13/045
340/682
5,140,849 A * 8/1992 Fujita ..................... F16C 19/52
73/593
(Continued)

FOREIGN PATENT DOCUMENTS

JP 2003130763 A 5/2003
JP 2014142324 A 8/2014
(Continued)

OTHER PUBLICATIONS

International Search Report (PCT/ISA/210) dated Nov. 19, 2019 issued by the International Searching Authority in International Application No. PCT/JP2019/032983.
(Continued)

*Primary Examiner* — Alexander A Mercado
(74) *Attorney, Agent, or Firm* — Sughrue Mion, PLLC

(57) ABSTRACT

An abnormality diagnosis method of a rolling bearing used in rotating machinery includes: a time acquisition step of acquiring, from an output signal detected by a sensor during the rotation of the rolling bearing, an entry time when a rolling element enters a flaking region of a bearing ring, and an escape time when the rolling element escapes from the flaking region of the bearing ring; and an estimation step of estimating a flaking size based on a flaking passage time, which is a time difference between the entry time and the escape time. When the bearing ring receives repeated load (Continued)

from the rolling element, the progress of the flaking occurring in the bearing ring can be quantitatively evaluated.

18 Claims, 9 Drawing Sheets

(52) U.S. Cl.
CPC ........ *G01L 5/0019* (2013.01); *F16C 2233/00* (2013.01); *F16C 2360/31* (2013.01)

(56) References Cited

U.S. PATENT DOCUMENTS

| | | | | |
|---|---|---|---|---|
| 7,184,930 | B2* | 2/2007 | Miyasaka | B61F 15/20 |
| | | | | 702/183 |
| 2002/0097040 | A1* | 7/2002 | Takizawa | F16C 19/527 |
| | | | | 324/174 |
| 2004/0030419 | A1 | 2/2004 | Miyasaka et al. | |
| 2006/0167659 | A1* | 7/2006 | Miyasaka | G01M 17/10 |
| | | | | 702/185 |
| 2007/0277613 | A1* | 12/2007 | Iwatsubo | G01M 13/045 |
| | | | | 73/593 |
| 2008/0010039 | A1 | 1/2008 | Miyasaka et al. | |
| 2008/0027659 | A1 | 1/2008 | Miyasaka et al. | |
| 2008/0033695 | A1* | 2/2008 | Sahara | G01H 1/003 |
| | | | | 702/185 |
| 2008/0234964 | A1* | 9/2008 | Miyasaka | F16C 19/527 |
| | | | | 702/113 |
| 2013/0116936 | A1* | 5/2013 | Yamamoto | G01N 29/14 |
| | | | | 702/34 |
| 2015/0369698 | A1* | 12/2015 | Sakaguchi | G01M 13/045 |
| | | | | 702/56 |
| 2016/0187226 | A1* | 6/2016 | Tsutsui | G01M 13/045 |
| | | | | 73/593 |
| 2019/0250066 | A1 | 8/2019 | Guo et al. | |

FOREIGN PATENT DOCUMENTS

| | | |
|---|---|---|
| JP | 2014206403 A | 10/2014 |
| JP | 2017026020 A | 2/2017 |
| JP | 2017032520 A | 2/2017 |
| WO | 2014175092 A1 | 10/2014 |
| WO | 2018/050008 A1 | 3/2018 |

OTHER PUBLICATIONS

Written Opinion (PCT/ISA/237) dated Nov. 19, 2019 issued by the International Searching Authority in International Application No. PCT/JP2019/032983.
Communication dated Feb. 4, 2020 issued by the Japanese Patent Office in Japanese Application No. 2019-568781.
Igarashi, T., et al., "The Transactions of the JSME (in Japanese) (C pieces)", vol. 47, No. 422, 1981, pp. 1327-1336 (11 pages).
I.K. Epps, "An Investigation Into Vibrations Excited By Discrete Faults in Rolling Element Bearings", Jul. 31, 1991, 284 total pages, XP055903722.
Communication dated Mar. 31, 2022 issued by the European Patent Office in counterpart European Application No. 19850902.8.

* cited by examiner

WHEN ROLLING ELEMENT ENTERS FLAKING

WHEN ROLLING ELEMENT ESCAPES FROM FLAKING

FIG. 7

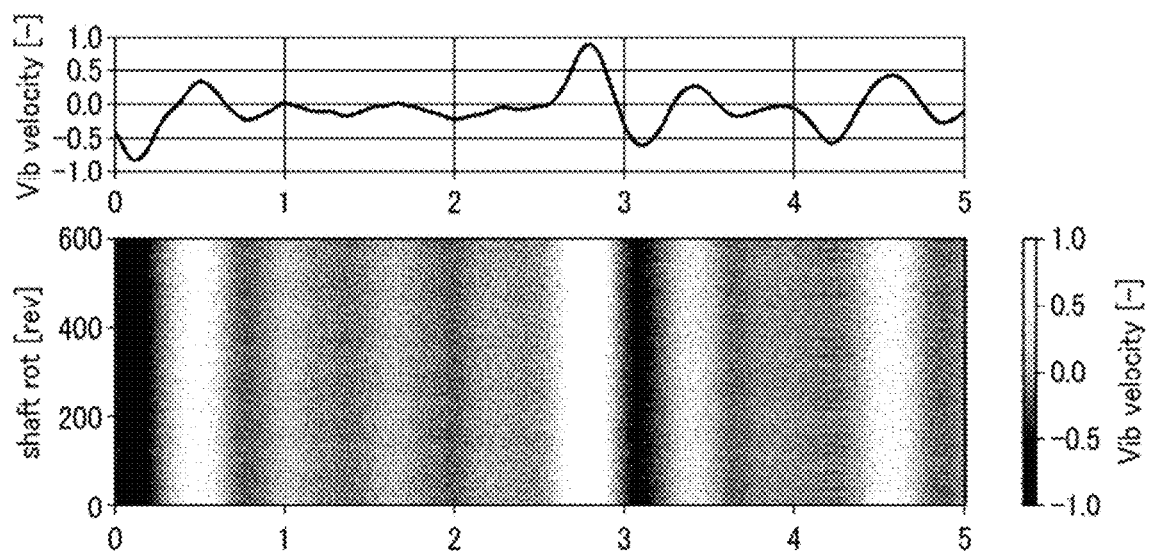

FIG. 8

| PART OF BEARING | FREQUENCY CORRESPONDING TO PART |
|---|---|
| INNER RING (Si) | $Zfi = \dfrac{fri}{2}\left(1 + \dfrac{Da}{dm}\cdot\cos\alpha\right)Z$ |
| OUTER RING (So) | $Zfc = \dfrac{fri}{2}\left(1 - \dfrac{Da}{dm}\cdot\cos\alpha\right)Z$ |
| ROLLING ELEMENT (Sb) | $2fb = fri\left(1 - \dfrac{Da^2}{dm^2}\cdot\cos^2\alpha\right)\dfrac{dm}{Da}$ |
| CAGE (Sc) | $fc = \dfrac{fri}{2}\left(1 - \dfrac{Da\cdot\cos\alpha}{dm}\right)$ | fri: FREQUENCY OF INNER RING (OUTER RING) (Hz)
fc: ROTATIONAL SPEED OF CAGE (Hz)
fb: ROTATIONAL SPEED OF ROLLING ELEMENT (Hz)
dm: PITCH DIAMETER OF ROLLING ELEMENT (mm)
Z: NUMBER OF ROLLING ELEMENTS
fi: fri-fc
Da: DIAMETER OF ROLLING ELEMENT (mm)
α: CONTACT ANGLE (rad)

METHOD AND DEVICE FOR DIAGNOSING ABNORMALITY IN ROLLING BEARING

This application is a National Stage of International Application No. PCT/JP2019/032983 filed on Aug. 23, 2019 claiming priority from JP Application No. 2018-156535 Aug. 23, 2018, the disclosures of which are incorporated herein in their entirety by reference.

TECHNICAL FIELD

The present invention relates to an abnormality diagnosis method and an abnormality diagnosis apparatus of a rolling bearing, and more particularly to an abnormality diagnosis method and an abnormality diagnosis apparatus of a rolling bearing capable of estimating a flaking size occurring in a bearing ring of the rolling bearing.

BACKGROUND ART

In a related art, various techniques are proposed for detecting vibration generated from a rolling bearing and diagnosing the presence or absence of an abnormality or an abnormal part in the rolling bearing in an actual operating state of a mechanical device without disassembling the mechanical device in which the rolling bearing is incorporated.

Further, since rolling bearings used in large rotating machines such as wind turbine drive trains and mining equipment are not easy to replace, these bearings are often used continuously even when some damage occurs. Thus, it is required to clearly grasp a replacement timing of bearings according to the progress of damage.

For example, in a state monitoring device of a rolling bearing described in Patent Literature 1, a relative displacement between an inner ring and an outer ring in a radial direction is detected by a displacement sensor, and a state of the rolling bearing is diagnosed according to a stepwise increase pattern of the relative displacement between the inner ring and the outer ring corresponding to an increase in the total number of times of load received by the inner ring of a stationary wheel from a plurality of rolling elements.

Further, in a state monitoring device described in Patent Literature 2, after a vibration waveform is divided into a plurality of damage filter frequency bands and extracted, the waveform is subjected to envelope processing and frequency analysis to obtain spectrum data. Then, in the extracted frequency band, a bearing damage frequency calculated based on a rotational speed signal of a rolling bearing is compared with a frequency component included in the spectral data, an abnormal part of the rolling bearing is identified, and a degree of damage or a progress of damage of a part is diagnosed based on a vibration effective value calculated for each damage filter frequency band.
Patent Literature 1: JP 2017-26020 A
Patent Literature 2: JP 2017-32520 A

SUMMARY OF INVENTION

However, in the device described in Patent Literature 1, degree of damage is divided into three stages based on the finding that the relative displacement of the inner ring and the outer ring gradually increases stepwise as the damage progresses, and this determination is limited to qualitative determination. Further, in the device described in Patent Literature 2, the degree of damage is diagnosed in three stages, and specifically, the progress of flaking is not evaluated quantitatively.

The present invention has been made in view of the above-described problems, and an object thereof is to provide an abnormality diagnosis method and an abnormality diagnosis apparatus of a rolling bearing capable of quantitatively evaluating a progress of flaking occurring in a bearing ring when the bearing ring receives a repeated load from a rolling element.

The above object of the present invention is achieved by the following configuration.

(1) An abnormality diagnosis method of a rolling bearing used in rotating machinery includes:
acquiring, from an output signal detected by a sensor during the rotation of the rolling bearing, an entry time when a rolling element enters a flaking region of a bearing ring, and an escape time when the rolling element escapes from the flaking region of the bearing ring; and
estimating a flaking size based on a flaking passage time, which is a time difference between the entry time and the escape time.

(2) An abnormality diagnosis apparatus of a rolling bearing used in rotating machinery includes:
a control device configured to acquire, from an output signal detected by a sensor during the rotation of the rolling bearing, an entry time when a rolling element enters a flaking region of a bearing ring, and an escape time when the rolling element escapes from the flaking region of the bearing ring, and estimate a flaking size based on a flaking passage time, which is a time difference between the entry time and the escape time.

(3) An abnormality diagnosis method of a rolling bearing used in rotating machinery includes:
acquiring, from an output signal detected by a sensor during the rotation of the rolling bearing, an entry time when a rolling element enters a flaking region of a bearing ring;
forming a gradation image by drawing the output signal in a rotation cycle of a rotation ring in gradation with the entry time as an origin and repeating the drawing for each rotation cycle of the rotation ring; and outputting the gradation image.

(4) An abnormality diagnosis apparatus of a rolling bearing used in rotating machinery includes:
a control device configured to acquire, from an output signal detected by a sensor during the rotation of the rolling bearing, an entry time when a rolling element enters a flaking region of a bearing ring, and form a gradation image by drawing the output signal in a rotation cycle of a rotation ring in gradation with the entry time as an origin and repeating the drawing for each rotation cycle of the rotation ring; and
an outputting device configured to output the gradation image.

According to the abnormality diagnosis method described in (1) and the abnormality diagnosis apparatus described in (2), by acquiring the time when the rolling element enters the flaking region of the bearing ring and the time when the rolling element escapes from the flaking region of the bearing ring and estimating the flaking size from the time difference between the entry time and the escape time, a progress of the flaking occurring in the bearing ring can be quantitatively evaluated, and a replacement timing of the bearing can be clearly grasped.

Further, according to the abnormality diagnosis method described in (3) and the abnormality diagnosis apparatus described in (4), the gradation image is formed by repeatedly drawing the output signal in gradation with the entry time, at which the rolling element enters the flaking region of the bearing ring, as an origin for each rotation cycle of the rotation ring. Thereby, it is possible for an operator to quantitatively evaluate and visually recognize a progress of flaking occurring in the bearing ring from the gradation image, and clearly grasp the replacement timing of the bearing.

BRIEF DESCRIPTION OF DRAWINGS

FIG. 7 illustrates a gradation image formed by drawing the waveform data illustrated in FIG. 6B in gradation and stacking waveform data for each rotation cycle of a rotation ring.

FIG. 8 is a table illustrating a relationship between a damaged part and a vibration frequency caused by the damage.

DESCRIPTION OF EMBODIMENTS

Hereinafter, preferred embodiments of an abnormality diagnosis method and an abnormality diagnosis apparatus of a rolling bearing according to the present invention will be described with reference to the drawings.

First Embodiment

Figure 1:
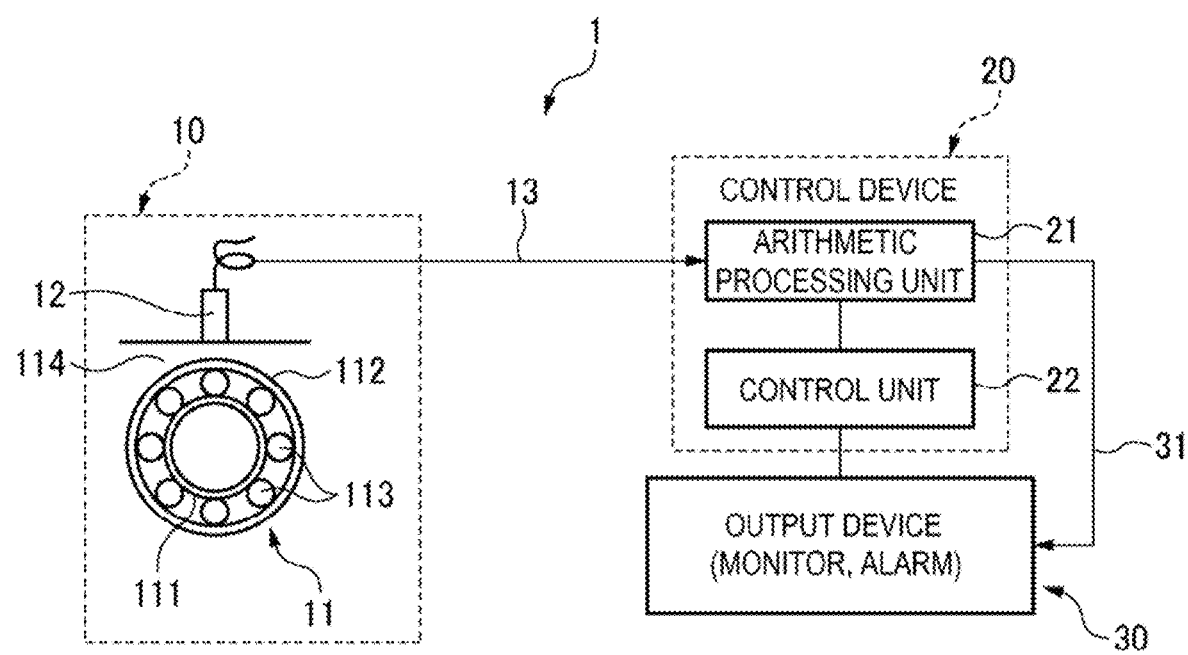
FIG. 1 is a block diagram illustrating a schematic configuration of an abnormality diagnosis apparatus of a rolling bearing according to each embodiment of the present invention.

Hereinafter, an abnormality diagnosis method and an abnormality diagnosis apparatus of a rolling bearing according to a first embodiment will be described with reference to FIGS. 1 to 3. As illustrated in FIG. 1, an abnormality diagnosis apparatus 1 of the present embodiment diagnoses an abnormality of a rolling bearing 11 incorporated in mechanical equipment 10, and includes a vibration sensor 12 that detects vibration (a signal) generated from the rolling bearing 11, a control device 20 including an arithmetic processing unit 21 that receives the signal detected by the vibration sensor 12 via a data transmission unit 13 and performs signal processing to estimate the presence or absence of flaking of a bearing ring (that is, an inner ring 111 or an outer ring 112) of the rolling bearing 11 and a flaking size in real time, and a control unit 22 that drives and controls the mechanical equipment 10, and an output device 30 including a monitor, an alarm, and the like.

Examples of the mechanical equipment 10 to which the abnormality diagnosis apparatus 1 of the present embodiment is applied include a wind turbine, mining equipment, and the like.

The rolling bearing 11 includes an inner ring 111 externally fitted to a rotating shaft of the mechanical equipment 10, an outer ring 112 fitted in a housing 114 or the like, a plurality of rolling elements 113 rotatably arranged between the inner ring 111 and the outer ring 112, and a cage (not illustrated) rotatably holding the rolling elements 113.

The vibration sensor 12 is fixed to a load zone of the housing 114 to which the outer ring 112, which is a fixed ring of the rolling bearing 11, is attached. FIG. 2 illustrates an embodiment in which an upper portion is the load zone. Examples of a fixing method of the vibration sensor 12 include bolt fixing, adhesion, a combination of bolt fixing and adhesion, and embedding with a resin material.

As the vibration sensor 12, a piezoelectric acceleration sensor, an electro-dynamic speedy sensor, or a displacement sensor can be used. A sensor can be appropriately used to equivalently detect vibration and convert the vibration into an electric signal by detecting acceleration, velocity, displacement, and the like according to an operating state of the rolling bearing. For example, acceleration may be detected when the rolling bearing rotates at a high speed, and displacement may be detected when the rolling bearing rotates at a low speed. As will be described later, in the present embodiment, flaking is analyzed using a vibration velocity waveform represented by velocity. Therefore, when an acceleration signal is detected, an output signal is converted by integration processing, and when a displacement signal is detected, an output signal is converted by differential processing to obtain the vibration velocity waveform.

The control device 20 includes a microcomputer (IC chip, CPU, MPU, DSP, and the like) and an internal memory (not illustrated). Therefore, since each processing to be described later can be executed by a program of the microcomputer, the device can be simplified, downsized, and inexpensively configured.

The control device 20 stores a diagnosis result of the rolling bearing 11 determined by the arithmetic processing unit 21 in the internal memory, outputs an operation of the mechanical equipment 10 to the control unit 22, and feeds back a control signal for driving the mechanical equipment 10 according to the diagnosis result to the operation of the mechanical equipment 10 (such as reducing a rotation speed). Further, the control device 20 transmits data to the output device 30 by a data transmission unit 31 using a wired or wireless communication in consideration of a network.

The output device 30 displays the diagnosis result of the rolling bearing 11 on a monitor and the like in real time. When an abnormality is detected, the alarm device such as a light or a buzzer may be used to alert an operator to the abnormality.

Further, since the data transmission unit 13 of the signal may be capable of accurately transmitting and receiving the signal from the vibration sensor 12, wired or wireless communication may be used in consideration of the network.

In the load zone of the rolling bearing 11, the rolling element 113 comes into contact with the inner ring 111 and the outer ring 112 and bears a predetermined rolling element load when the rolling element 113 passes through a sound portion (a normal region without flaking). On the other hand, when the flaking occurs, generally, since a flaking depth is larger than an elastic approach amount of Hertzian contact between the rolling element 113 and the bearing ring, the rolling element 113 is in contact with only one of the inner ring 111 and the outer ring 112 while passing through a flaking region of the bearing ring, and the rolling element load is smaller than the rolling element load in the sound portion in a state in which the rolling element 113 passes through the inside of the flaking.

Figure 2A:
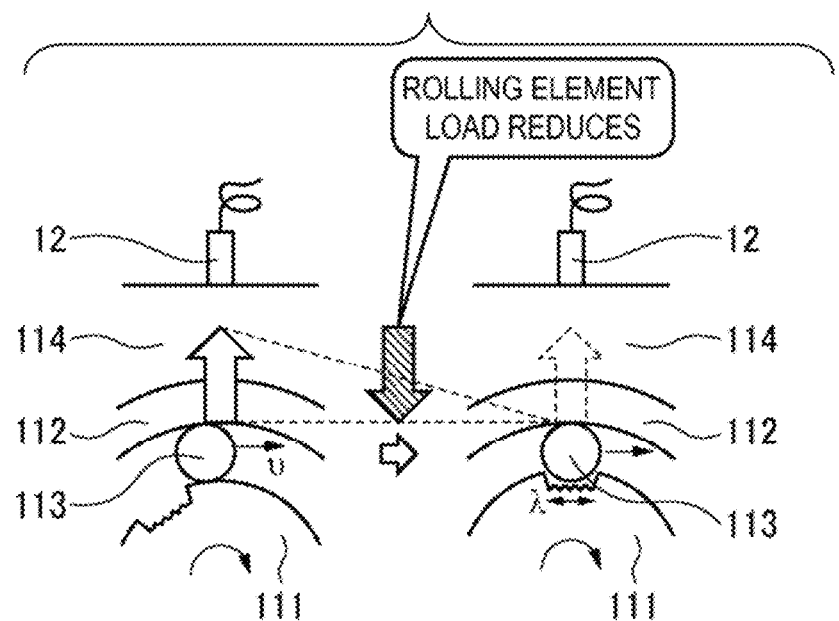
FIG. 2A is a diagram for illustrating a roller load when a rolling element enters a flaking region of a bearing ring.
Figure 2B:
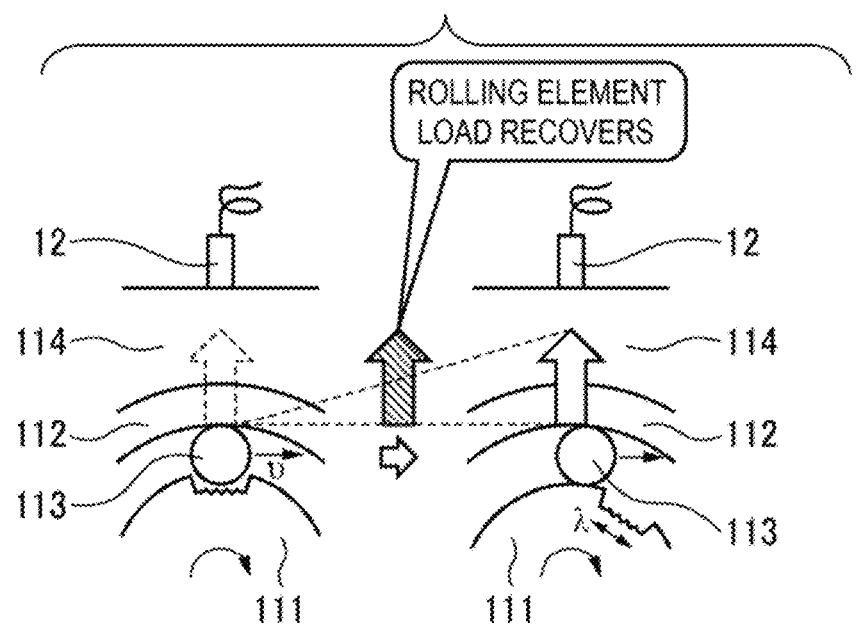
FIG. 2B is a diagram for illustrating a roller load when the rolling element escapes from the flaking region of the bearing ring.

More specifically, as illustrated in FIG. 2A, before the rolling element 113 enters the flaking region of the inner ring 111, the rolling element load is borne by the housing 114 via the outer ring 112, but when the rolling element 113 enters the flaking region of the inner ring 111, the rolling element load decreases. A change in the rolling element load is regarded as a negative maximum value (a bottom portion) of the vibration velocity when a direction toward a radially outer side is defined as a positive direction. In FIGS. 2A and 2B, reference sign λ denotes a flaking length (unit: [m], [mm] and the like), and reference sign v denotes a revolution velocity of the rolling element (unit: [m/s] and the like).

As illustrated in FIG. 2B, when the rolling element 113 escapes from the flaking region of the inner ring 111, the rolling element load borne by the housing 114 via the outer ring 112 increases and recovers, and the change in the rolling element load is regarded as a positive maximum value (a top portion) of the vibration velocity.

That is, when the rolling element 113 enters or escapes from the flaking region of the inner ring 111, since directions of the changes in the rolling element load are different, the decrease in the rolling element load appears as the negative maximum value (the bottom portion) of the vibration velocity, and the increase in the rolling element load appears as the positive maximum value (the top portion) of the vibration velocity.

Further, in practice, in one rotation cycle of the inner ring 111, which is a rotation ring, a number of collisions caused when the rolling element 113 passes through the flaking region of the inner ring in the load zone appear as vibration, but in the present embodiment, the vibration velocity which is the negative or positive maximum value generated when the rolling element 113 in the load zone passes through the flaking region of the inner ring is acquired for diagnosis.

Incidentally, since flaking propagates in a rotation direction, an axial direction, and a depth direction of the inner ring microscopically, whether the flaking occurs is determined by comparing an absolute value of the negative or positive maximum value of the vibration velocity with a threshold, and when the absolute value is larger than the threshold, it is determined that the flaking occurs.

Figure 3:
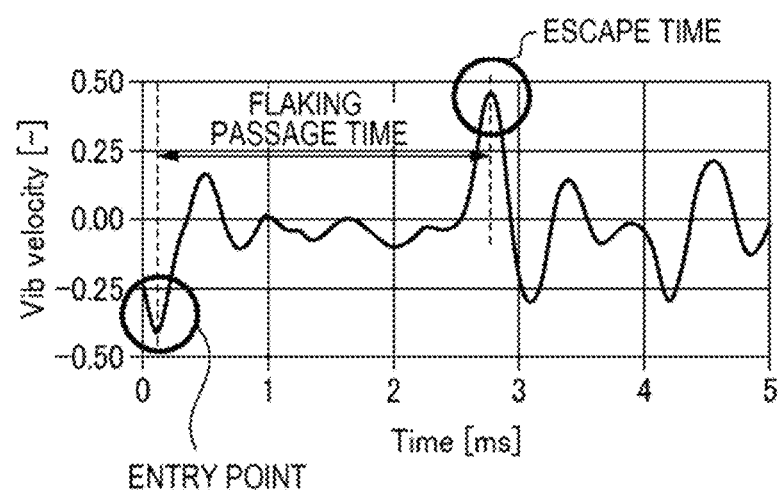
FIG. 3 is a graph of a vibration velocity waveform for illustrating a flaking passage time of the bearing ring according to a first embodiment of the present invention.

When the flaking occurs, the arithmetic processing unit 21 acquires, from the vibration velocity waveform output as illustrated in FIG. 3, a time indicated by the negative maximum value of the vibration velocity (the bottom portion) as an entry time when the rolling element 113 enters the flaking region of the bearing ring, and a time indicated by the positive maximum value (the top portion) of the vibration velocity within a predetermined time from the entry time as an escape time when the rolling element 113 escapes from the flaking region of the bearing ring.

Here, the predetermined time is set to be a period slightly longer than a vibration cycle of bearing damage (a time interval at which the rolling element passes through the flaking region of the inner ring). For example, the predetermined time is set to be equal to or less than twice the interval at which the rolling element passes through the flaking region of the inner ring.

Since it is possible to select which direction is the positive direction, the output of the vibration sensor 12 may be represented as the positive maximum value (the top portion) when the rolling element enters the flaking region of the inner ring, and may be represented as the negative maximum value (the bottom portion) when the rolling element escapes from the flaking region. In this case, the time indicated by the positive maximum value (the top portion) of the vibration velocity is set as the entry time, and the time indicated by the negative maximum value (the bottom portion) of the vibration velocity is set as the escape time.

Figure 4A:
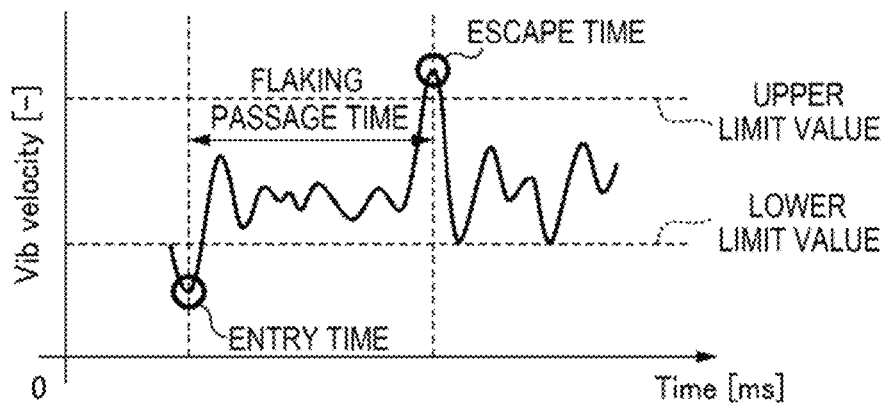
FIG. 4A is a graph of another vibration velocity waveform for illustrating the time required for the rolling element to pass through flaking of the bearing ring.
Figure 4B:
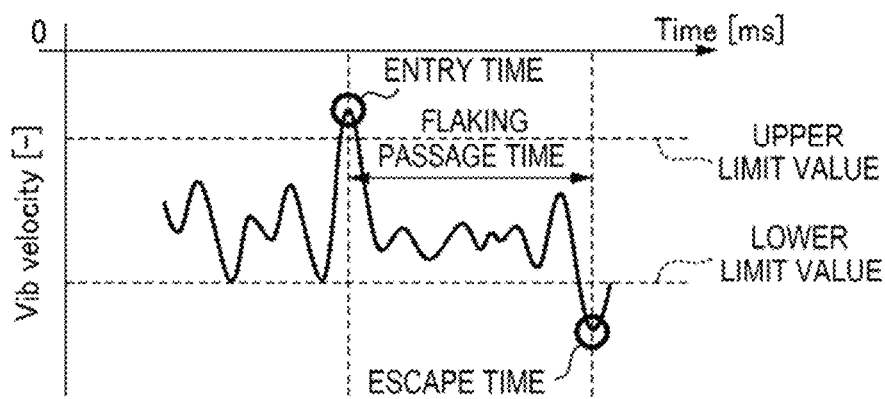
FIG. 4B is a graph of further another vibration velocity waveform for illustrating the time required for the rolling element to pass through the flaking of the bearing ring.

As illustrated in FIGS. 4A and 4B, depending on the outputs of the vibration sensor 12, the maximum value (the top portion) and the minimum value (the bottom portion) of the vibration velocity indicating the entry time and the escape time may both be positive values or negative values.

In this case, in the vibration velocity waveform acquired from the output signal, the time indicating either one of the maximum value of the vibration velocity larger than the predetermined upper limit value and the minimum value of the vibration velocity smaller than the predetermined lower limit value within the rotation cycle of the inner ring may be acquired as the entry time, and the time indicating the other of the maximum value and the minimum value of the vibration velocity within the predetermined time from the entry time may be acquired as the escape time.

Next, the arithmetic processing unit 21 estimates the flaking size based on a flaking passage time, which is a time difference between the entry time and the escape time. Specifically, in the present embodiment where the inner ring is rotated and the outer ring is fixed, when the flaking occurs in the inner ring, the flaking size is given by the following Formula (1).

[Formula 1]

$$\text{flaking size} = \text{flaking passage time} \times \text{relative velocity of inner ring and rolling element} = \tau \times \frac{(d_m - D_a)}{2} \cdot 2\pi f_i \quad (1)$$

Further, when the flaking occurs in the outer ring, the flaking size is given by the following Formula (2).

[Formula 2]

$$\text{flaking size} = \quad (2)$$
$$\text{flaking passage time} \times \text{revolution velocity of rolling element} =$$
$$\tau \times \frac{(d_m - D_a)}{2} \cdot 2\pi f_c$$

Different from the present embodiment, in a rolling bearing whose inner ring is fixed and outer ring is rotated, the flaking size is given by the following Formula (3) when the flaking occurs in the inner ring, and the flaking size is given by the following Formula (4) when the flaking occurs on the outer ring. In this case, the vibration sensor 12 may be attached to a stationary side shaft.

[Formula 3]

$$\text{flaking size} = \quad (3)$$
$$\text{flaking passage time} \times \text{revolution velocity of rolling element} =$$
$$\tau \times \frac{(d_m - D_a)}{2} \cdot 2\pi f_c$$

[Formula 4]

$$\text{flaking size} = \text{flaking passage time} \times \text{relative velocity of} \quad (4)$$
$$\text{inner ring and rolling element} = \tau \times \frac{(d_m - D_a)}{2} \cdot 2\pi f_e$$

The following represents the meaning of each reference sign in Formulas (1) to (4).
 $\tau$: flaking passage time
 $d_m$: pitch circle diameter (PCD) of rolling element
 $D_a$: diameter of rolling element
 $f_{ri}$: rotation frequency of inner ring
 $f_{re}$: rotation frequency of outer ring
 $f_c$: revolution frequency of rolling element
 $f_i = f_{ri} - f_c$
 $f_e = f_{re} - f_c$ Here, the determination of whether the flaking occurs in the inner ring or the outer ring may be determined based on an interval between time points of entering the flaking region of the rolling elements 113 in the rotation cycle of the inner ring 111, or may be determined by using a method of determining a damage position based on whether measured frequency components generated by performing analysis processing such as envelope analysis on measured data detected from the rolling bearing match theoretical frequency components of the inner ring and the outer ring obtained by calculation.

Accordingly, the control unit 22 may stop the mechanical equipment 10 based on the obtained flaking size, or may perform control so as to reduce the rotation speed.

Further, if it is determined that the flaking size will not cause serious damage by the time the rolling bearing 11 is replaced even if the rolling bearing 11 is operated as it is, the control unit 22 does not perform the control described above and may continue the operation of the mechanical equipment 10 as it is.

As described above, the abnormality diagnosis method and the abnormality diagnosis apparatus 1 according to the present embodiment include a step of acquiring, from the output signal detected by the vibration sensor 12 during the rotation of the rolling bearing 11, the entry time when the rolling element 113 enters the flaking region of the inner ring 111 or the outer ring 112 which is the bearing ring, and the escape time when the rolling element 113 escapes from the flaking region of the bearing ring, and a step of estimating the flaking size based on the flaking passage time, which is the time difference between the entry time and the escape time. Thus, the progress of the flaking occurring in the bearing ring can be quantitatively evaluated, and a replacement timing of the bearing can be clearly grasped.

Second Embodiment

Next, an abnormality diagnosis method and an abnormality diagnosis apparatus of a rolling bearing according to a second embodiment will be described with reference to FIGS. 5 to 7. Similar components as those in the first embodiment are denoted by the same or corresponding reference numerals, and a description thereof is omitted or simplified.

The present embodiment is different from the first embodiment in that after the entry time of the inner ring 111 into the flaking region is acquired from the output signal obtained by using the vibration sensor 12, a gradation image (see FIG. 7) based on a vibration velocity waveform is displayed with an entry time as an origin, and an escape time is acquired.

Figure 5:
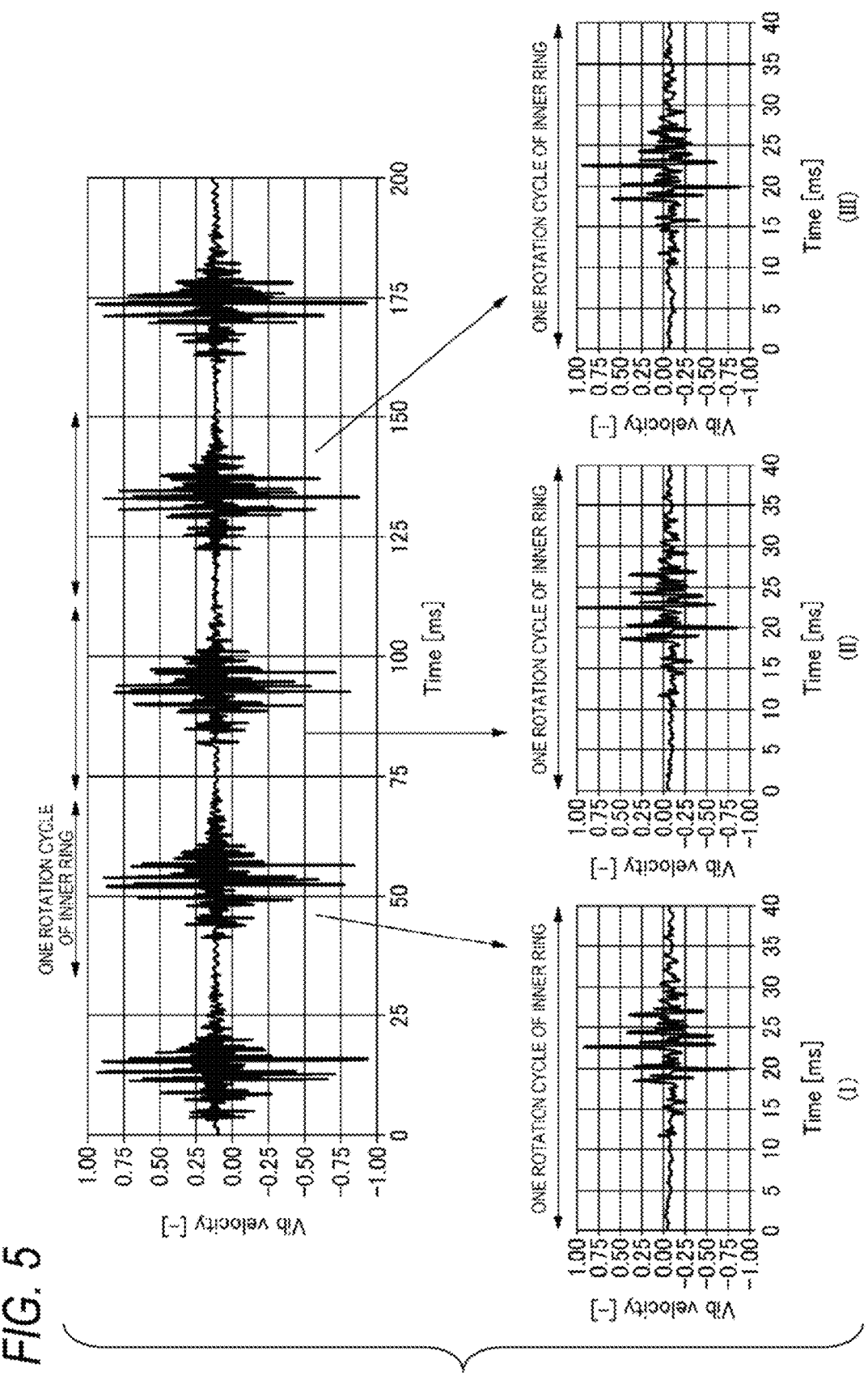
FIG. 5 is a diagram for illustrating an example of cutting off a vibration velocity waveform for each rotation cycle of an inner ring from a vibration velocity waveform according to a second embodiment of the present invention.

Specifically, as illustrated in FIG. 5, from the obtained vibration velocity waveform data, data is clipped for each rotation cycle (for example, 40 ms) of the inner ring 111 and a desired number of pieces of data (I), (II), (III) . . . (n) is obtained. For example, (I), (II), and (III) in FIG. 5 indicate that the vibration velocity waveform data for three rotations of the inner ring 111 is obtained.

Figure 6A:
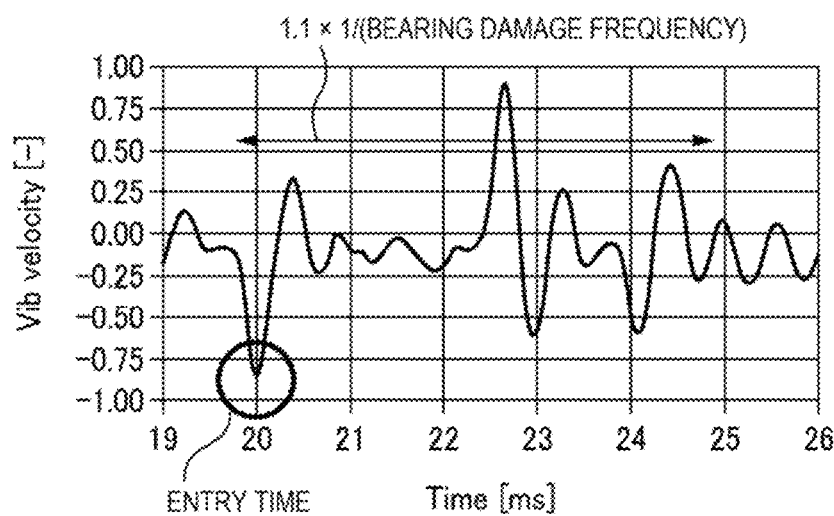
FIG. 6A is a graph for illustrating a step of acquiring an entry time from cut-off waveform data and acquiring a vibration velocity waveform of a predetermined cycle.

Then, from each of the cut-off data, as illustrated in FIG. 6A, the vibration velocity of the negative maximum value (the bottom portion) is acquired as the entry time. Further, vibration velocity waveform data having a cycle of 1.1×[1/bearing damage frequency] from the entry time, that is, vibration velocity waveform data having a cycle slightly longer than a bearing damage cycle (a time interval at which adjacent rolling elements reach the flaking region of the inner ring) is acquired from each of the clipped data. In this case, the bearing damage frequency uses the frequency of the inner ring 111 in occurrence interval frequencies corresponding to the damage of each part due to the rotational speed illustrated in FIG. 8.

Figure 6B:
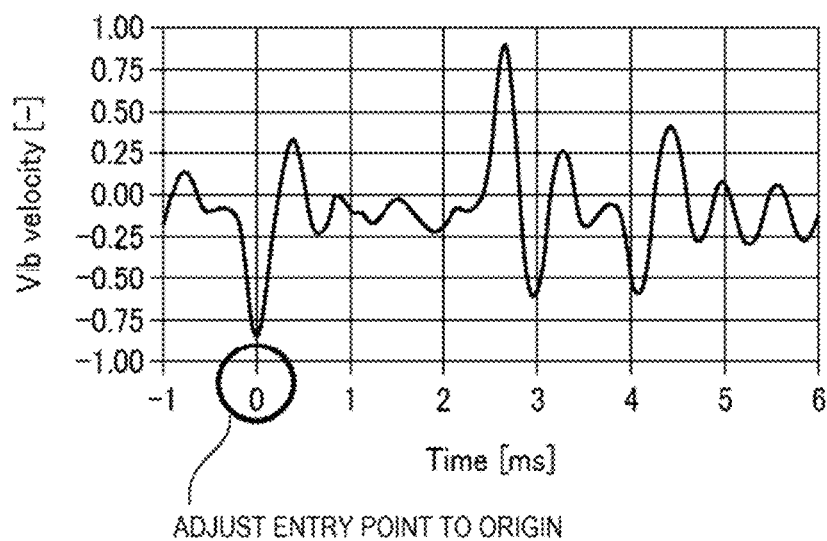
FIG. 6B is a graph in which the waveform data in FIG. 6A is used as original data and replaced with coordinate data with the entry time set as an origin.

As illustrated in FIG. 6B, the vibration velocity waveform data is replaced with coordinate data with the entry time as the origin.

Then, drawing is performed in which the entry time is set as the origin, the positive vibration velocity in the rotation cycle of the inner ring 111 is set to white, and the negative vibration velocity is set to black, the gradation drawing is repeated for each rotation cycle of the inner ring 111 so as to be stacked along a vertical axis of a graph, and then a gradation image as illustrated in FIG. 7 is formed. The gradation image is output by the output device 30.

The color arrangement of the gradation drawing is not limited to black and white as long as the magnitude of the positive and negative vibration velocities can be visually recognized. Further, in order to clarify the gradation, noise may be removed by using a low-pass filter that processes 10 kHz or less.

On the basis of the acquired gradation image, the control device 20 performs image processing to acquire the most white position as the escape time.

The image processing is preferably performed by automatic processing. An example of the automatic processing is a method using machine learning. As teacher data used in the learning, a gradation image A of the above method is created using a bearing having a known flaking size. A learning model is obtained by learning the flaking size and the gradation image A in association with each other. New gradation image data is applied to the learning model, and the flaking size is estimated.

A general machine learning software may be used, and examples thereof include TensorFlow (registered trademark) and scikit-learn. However, the machine learning software is not limited to these.

Thereafter, similar to the first embodiment, the flaking size is estimated based on the flaking passage time of the inner ring, which is the time difference between the obtained entry time and the escape time.

Therefore, also in the present embodiment, when the bearing ring receives repeated load from the rolling element, the progress of the flaking occurring in the bearing ring can be quantitatively evaluated, and the replacement timing of the bearing can be clearly grasped. Further, it is possible for the operator to visually recognize the progress of the flaking occurring in the bearing ring by the gradation image, and correctly determine the abnormality of the mechanical equipment.

Third Embodiment

Next, an abnormality diagnosis method and an abnormality diagnosis apparatus of a rolling bearing according to a third embodiment will be described. Similar components as those in the first or second embodiment are denoted by the same or corresponding reference numerals, and a description thereof is omitted or simplified.

In the above embodiment, the change in the rolling element load is diagnosed as a change in the vibration velocity by using the vibration sensor, but in the present embodiment, the rolling element load is directly detected by using a load sensor that detects the rolling bearing load.

Figure 9A:
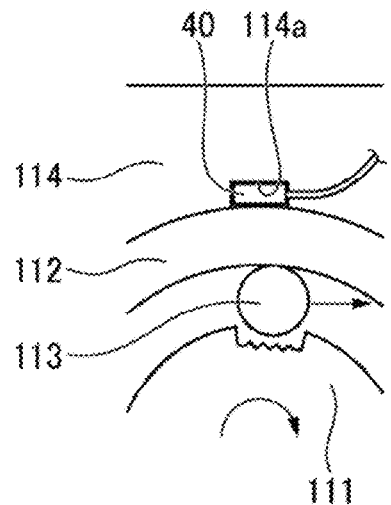
FIG. 9A is a diagram illustrating an example in which a piezoelectric force sensor is installed in mechanical equipment as a load sensor.

The load sensor may be a piezoelectric force sensor 40, and in this case, as illustrated in FIG. 9A, the piezoelectric force sensor 40 may be installed in a notch 114a provided in the housing 114 to measure the change in the rolling element load between the housing 114 and the outer ring 112.

Figure 9B:
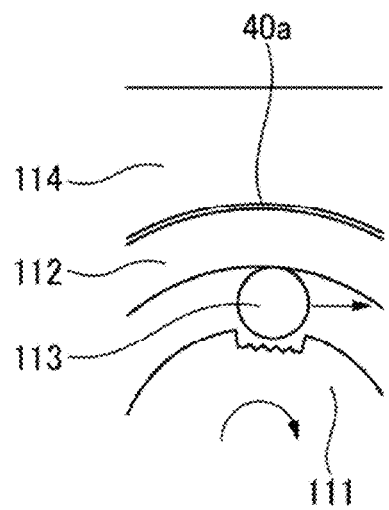
FIG. 9B is a diagram illustrating an example in which a piezoelectric film is installed in the mechanical equipment as a load sensor.
Figure 9C:
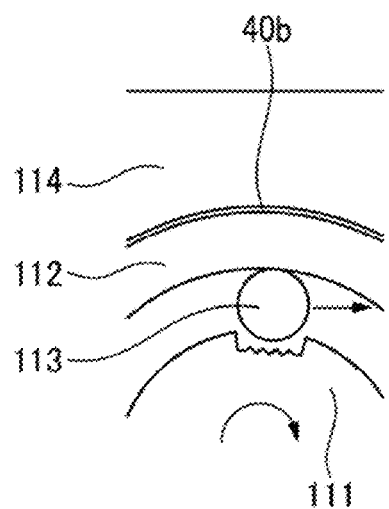
FIG. 9C is a diagram illustrating an example in which an optical fiber is installed in the mechanical equipment as a load sensor.

Alternatively, the load sensor may be a piezoelectric film 40a as illustrated in FIG. 9B or an optical fiber 40b as illustrated in FIG. 9C. In either case, when the piezoelectric film 40a or the optical fiber 40b is sandwiched between the housing 114 and the outer ring 112, the change in the rolling element load is measured.

Therefore, since a waveform representing the load is acquired from the load sensor, in the time acquisition step, a time when the load decreases below a threshold in a rotation cycle of the rotation ring in a waveform representing the load is set as the entry time, and a time when the load increases above the threshold within a predetermined time from the entry time is set as the escape time.

Further, in the present embodiment, similar to the first embodiment, the flaking size is estimated based on the flaking passage time, which is the time difference between the obtained entry time and the escape time.

Therefore, as in the present embodiment, in the case where the load sensor is used, when the bearing ring receives repeated load from the rolling element, the progress of the flaking occurring in the bearing ring can be quantitatively evaluated, and the replacement timing of the bearing can be clearly grasped.

In the present invention, similar to the second embodiment, when the rolling element load is detected using the load sensor, the gradation image may be formed by acquiring the entry time from the waveform representing the load, drawing the load in gradation in the rotation cycle of the rotation ring with the entry time as the origin, and repeating the gradation drawing for each rotation cycle of the rotating ring. Further, the escape time may be acquired from the gradation image.

Fourth Embodiment

Next, an abnormality diagnosis method and an abnormality diagnosis apparatus of a rolling bearing according to a fourth embodiment will be described. Similar components as those in the first to third embodiments are denoted by the same or corresponding reference numerals, and a description thereof is omitted or simplified.

In the second embodiment, the gradation image is formed by drawing the vibration waveform in gradation in the rotation cycle of the inner ring 111 with the entry time as the origin, repeating the gradation drawing for each rotation cycle of the inner ring 111, and stacking the gradation drawing along the vertical axis of the graph. However, in the present embodiment, the gradation image is acquired over a longer period of time.

In the present embodiment, the gradation image is formed by repeating, for each rotation cycle of the inner ring 111, the gradation drawing in which the vibration waveform in the rotation cycle of the inner ring 111 is drawn along the vertical axis using the entry time as the origin, and stacking the gradation drawing along a horizontal axis. Further, FIG. 10 shows an excerpt from the above gradation image in the range of the vertical axis of one pitch (a distance between points on outer peripheral surface of the inner ring with which adjacent rolling elements are in contact) with an operation time from 65 hours to 90 hours.

Figure 10:
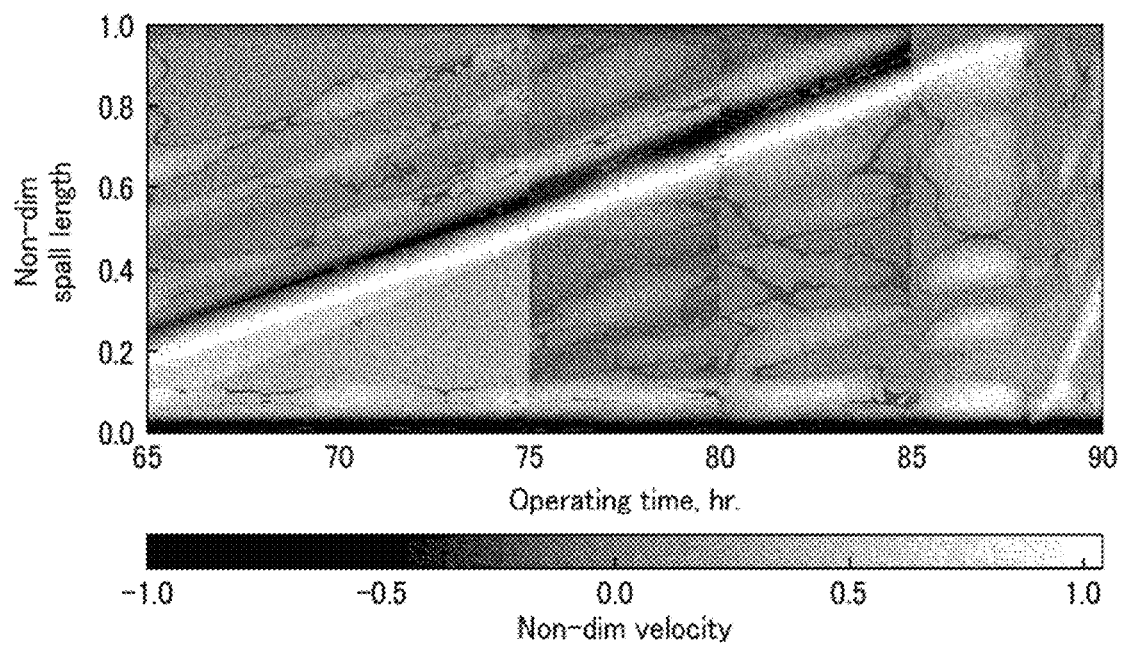
FIG. 10 illustrates a gradation image formed by drawing waveform data in gradation and stacking waveform data for each rotation cycle of a rotation ring in an abnormality diagnosis apparatus of a rolling bearing according to a fourth embodiment of the present invention.

Accordingly, from the gradation image illustrated in FIG. 10, it is possible to visually grasp, as an inclination, that a flaking length becomes longer with the progress of the operation time, and a degree of the progress of the flaking becomes easier to determine. Further, in FIG. 10, by comparing the inclinations of the regions A and B, it can be seen that when the flaking length exceeds one pitch, a progress speed of the flaking rapidly increases.

In the present embodiment, it is possible to estimate the flaking length after a predetermined time (predetermined operation time) from the inclination obtained in the region A of FIG. 10. Further, by using the result, it is possible to estimate the predetermined time (predetermined operation time) until the progress speed of the flaking increases rapidly and the flaking length reaches one pitch.

The estimation of the flaking length using the gradation image according to the present embodiment can also be applied to the gradation image obtained from the waveform representing the load described in the third embodiment.

The abnormality diagnosis method and the abnormality diagnosis apparatus of the present invention are not limited to the embodiment described above, and modifications, improvements, or the like can be made as appropriate. For example, a bearing type to which the present invention can be applied is not limited, and the present invention can be applied to all types of rolling bearings including ball bearings.

In a case where a time difference occurs between the time at which the rolling element enters the flaking region of the bearing ring and the time indicated by the negative maximum value of the vibration velocity in accordance with the flaking size occurring in the bearing ring and the size of the rolling element, for example, the time exceeding the threshold immediately before the negative maximum value may be set as the time at which the rolling element enters the flaking region of the bearing ring.

As described above, the present description discloses the following matters.

(1) An abnormality diagnosis method of a rolling bearing used in rotating machinery includes:

acquiring, from an output signal detected by a sensor during the rotation of the rolling bearing, an entry time when a rolling element enters a flaking region of a bearing ring, and an escape time when the rolling element escapes from the flaking region of the bearing ring; and estimating a flaking size based on a flaking passage time, which is a time difference between the entry time and the escape time.

According to this configuration, a progress of flaking occurring in the bearing ring can be quantitatively evaluated, and a replacement timing of the bearing can be clearly grasped.

(2) In the abnormality diagnosis method of a rolling bearing according to (1), the sensor is a vibration sensor configured to detect a vibration of the rolling bearing, and the acquiring the entry time and the escape time includes:

setting a time indicating a maximum value of either one of negative and positive vibration velocities whose absolute value is larger than a threshold in a rotation cycle of a rotation ring in a vibration velocity waveform acquired from the output signal as the entry time; and setting a time indicating a maximum value of another of the negative and positive vibration velocities in a predetermined time from the entry time as the escape time.

According to this configuration, a change in a rolling element load can be grasped as a change in the vibration velocity by using the vibration sensor, and the entry time and the escape time can be easily acquired from the vibration velocity waveform.

(3) in the abnormality diagnosis method of a rolling bearing according to (1), the sensor is a vibration sensor configured to detect a vibration of the rolling bearing, and the acquiring the entry time and the escape time includes:

setting a time indicating either one of a maximum value of a vibration velocity larger than a predetermined upper limit value and a minimum value of the vibration velocity smaller than a predetermined lower limit value in a rotation cycle of a rotation ring in a vibration velocity waveform acquired from the output signal as the entry time; and setting a time indicating the other of the maximum value and the minimum value of the vibration velocity in a predetermined time from the entry time as the escape time.

According to this configuration, the change in the rolling element load can be grasped as the change in the vibration velocity by using the vibration sensor, and the entry time and the escape time can be easily acquired from the vibration velocity waveform.

(4) In the abnormality diagnosis method of a rolling bearing according to (1), the sensor is a vibration sensor configured to detect a vibration of the rolling bearing, the acquiring the entry time and the escape time includes:

setting a time indicating a maximum value of either one of negative and positive vibration velocities whose absolute value is larger than a threshold in a rotation cycle of a rotation ring in a vibration velocity waveform acquired from the output signal as the entry time; and acquiring the escape time from a gradation image formed by drawing the vibration velocity in gradation in the rotation cycle of the rotation ring with the entry time as an origin and repeating the drawing for each rotation cycle of the rotation ring.

According to this configuration, the change in the rolling element load can be grasped as the change in the vibration velocity by using the vibration sensor, and the entry time and the escape time can be easily acquired from the vibration velocity waveform. Further, it is possible for an operator to visually recognize the progress of the flaking occurring in the bearing ring, and correctly determine the abnormality of mechanical equipment.

(5) In the abnormality diagnosis method of a rolling bearing according to (1), the sensor is a vibration sensor configured to detect a vibration of the rolling bearing, the acquiring the entry time and the escape time includes:

setting a time indicating either one of a maximum value of a vibration velocity larger than a predetermined upper limit value and a minimum value of the vibration velocity smaller than a predetermined lower limit value in a rotation cycle of a rotation ring in a vibration velocity waveform acquired from the output signal as the entry time, and acquiring the escape time from a gradation image formed by drawing the vibration velocity in gradation in the rotation cycle of the rotation ring with the entry time as an origin and repeating the drawing for each rotation cycle of the rotation ring.

According to this configuration, the change in the rolling element load can be grasped as the change in the vibration velocity by using the vibration sensor, and the entry time and the escape time can be easily acquired from the vibration velocity waveform. Further, it is possible for the operator to visually recognize the progress of the flaking occurring in the bearing ring, and correctly determine the abnormality of the mechanical equipment.

(6) In the abnormality diagnosis method of a rolling bearing according to (4) or (5), further includes:

acquiring transition of a flaking length as an inclination from the gradation image; and estimating the flaking length after a predetermined time based on the inclination.

According to this configuration, the flaking length after the predetermined time can be evaluated, and the replacement timing of the bearing can be clearly grasped.

(7) In the abnormality diagnosis method of a rolling bearing according to (1), the sensor is a load sensor configured to detect a rolling bearing load, and the acquiring the entry time and the escape time includes:

setting a time when the rolling bearing load decreases below a threshold in a rotation cycle of a rotation ring in a waveform representing the rolling bearing load as the entry time; and setting a time when the rolling bearing load increases above the threshold within a predetermined time from the entry time as the escape time.

According to this configuration, the entry time and the escape time can be easily acquired from the waveform representing the change in the rolling element load by using the load sensor.

(8) In the abnormality diagnosis method of a rolling bearing according to (1), the sensor is a load sensor configured to detect a rolling bearing load, the acquiring the entry time and the escape time includes:
setting a time when the rolling bearing load decreases below a threshold in a rotation cycle of a rotation ring in a waveform representing the rolling bearing load as the entry time; and
acquiring the escape time from a gradation image formed by drawing the rolling bearing load in gradation in the rotation cycle of the rotation ring with the entry time as an origin and repeating the drawing for each rotation cycle of the rotation ring.

According to this configuration, the entry time and the escape time can be easily acquired from the waveform representing the change in the rolling element load by using the load sensor, and it is possible for the operator to visually recognize the progress of the flaking occurring in the bearing ring, and correctly determine an abnormality of the mechanical equipment.

(9) In the abnormality diagnosis method of a rolling bearing according to (8), further includes:
acquiring transition of a flaking length as an inclination from the gradation image; and estimating the flaking length after a predetermined time from the inclination.

According to this configuration, the flaking length after the predetermined time can be evaluated, and the replacement timing of the bearing can be clearly grasped.

(10) An abnormality diagnosis apparatus of a rolling bearing used in rotating machinery includes:
a control device configured to acquire, from an output signal detected by a sensor during the rotation of the rolling bearing, an entry time when a rolling element enters a flaking region of a bearing ring, and an escape time when the rolling element escapes from the flaking region of the bearing ring, and estimate a flaking size based on a flaking passage time, which is a time difference between the entry time and the escape time.

According to this configuration, a progress of flaking occurring in the bearing ring can be quantitatively evaluated, and a replacement timing of the bearing can be clearly grasped.

(11) In the abnormality diagnosis apparatus of a rolling bearing according to (10),
the sensor is a vibration sensor configured to detect a vibration of the rolling bearing, and
the control device is configured to set, as the entry time, a time indicating a maximum value of either one of negative and positive vibration velocities whose absolute value is larger than a threshold in a rotation cycle of a rotation ring in a vibration velocity waveform obtained from the output signal, and set, as the escape time, a time indicating a maximum value of the other of the negative and positive vibration velocities in a predetermined time from the entry time.

According to this configuration, a change in a rolling element load can be grasped as a change in the vibration velocity by using the vibration sensor, and the entry time and the escape time can be easily acquired from the vibration velocity waveform.

(12) In the abnormality diagnosis apparatus of a rolling bearing according to (10),
the sensor is a vibration sensor configured to detect a vibration of the rolling bearing, and
the control device is configured to set, as the entry time, a time indicating either one of a maximum value of a vibration velocity larger than a predetermined upper limit value and a minimum value of the vibration velocity smaller than a predetermined lower limit value in a rotation cycle of a rotation ring in a vibration velocity waveform acquired from the output signal, and set, as the escape time, a time indicating the other of the maximum value and the minimum value of the vibration velocity in a predetermined time from the entry time.

According to this configuration, the change in the rolling element load can be grasped as the change in the vibration velocity by using the vibration sensor, and the entry time and the escape time can be easily acquired from the vibration velocity waveform.

(13) In the abnormality diagnosis apparatus of a rolling bearing according to (10),
the sensor is a vibration sensor configured to detect a vibration of the rolling bearing,
the control device is configured to
set, as the entry time, a time indicating a maximum value of either one of negative and positive vibration velocities whose absolute value is larger than a threshold in a rotation cycle of a rotation ring in a vibration velocity waveform acquired from the output signal, and
acquire the escape time from a gradation image formed by drawing a vibration velocity in gradation in the rotation cycle of the rotation ring with the entry time as an origin and repeating the drawing for each rotation cycle of the rotation ring.

According to this configuration, the change in the rolling element load can be grasped as the change in the vibration velocity by using the vibration sensor, and the entry time and the escape time can be easily acquired from the vibration velocity waveform. Further, it is possible for an operator to visually recognize the progress of the flaking occurring in the bearing ring, and correctly determine the abnormality of mechanical equipment.

(14) In the abnormality diagnosis apparatus of a rolling bearing according to (10),
the sensor is a vibration sensor configured to detect a vibration of the rolling bearing,
the control device is configured to
set, as the entry time, a time indicating either one of a maximum value of a vibration velocity larger than a predetermined upper limit value and a minimum value of the vibration velocity smaller than a predetermined lower limit value in a rotation cycle of a rotation ring in a vibration velocity waveform acquired from the output signal, and
acquire the escape time from a gradation image formed by drawing a vibration velocity in gradation in the rotation cycle of the rotation ring with the entry time as an origin and repeating the drawing for each rotation cycle of the rotation ring.

According to this configuration, the change in the rolling element load can be grasped as the change in the vibration velocity by using the vibration sensor, and the entry time and the escape time can be easily acquired from the vibration velocity waveform. Further, it is possible for the operator to visually recognize the progress of the flaking occurring in the bearing ring, and correctly determine the abnormality of mechanical equipment.

(15) In the abnormality diagnosis apparatus of a rolling bearing according to (13) or (14),
the control device is configured to acquire transition of a flaking length as an inclination from the gradation image, and estimate the flaking length after a predetermined time based on the inclination.

According to this configuration, the flaking length after the predetermined time can be evaluated, and the replacement timing of the bearing can be clearly grasped.

(16) In the abnormality diagnosis apparatus of a rolling bearing according to (10), the sensor is a load sensor configured to detect a rolling bearing load, and the control device is configured to set, as the entry time, a time when the load decreases below a threshold in a rotation cycle of a rotation ring in a waveform representing the rolling bearing load, and set, as the escape time, a time when the load increases above the threshold within a predetermined time from the entry time.

According to this configuration, the entry time and the escape time can be easily acquired from the waveform representing the change in the rolling element load by using the load sensor.

(17) In the abnormality diagnosis apparatus of a rolling bearing according to (10), the sensor is a load sensor configured to detect a rolling bearing load, and the control device is configured to set, as the entry time, a time when the load decreases below a threshold in a rotation cycle of a rotation ring in a waveform representing the rolling bearing load, and acquire the escape time from a gradation image formed by drawing the rolling bearing load in gradation in the rotation cycle of the rotation ring with the entry time as an origin and repeating the drawing for each rotation cycle of the rotation ring.

According to this configuration, the entry time and the escape time can be easily acquired from the waveform representing the change in the rolling element load by using the load sensor, and it is possible for the operator to visually recognize the progress of the flaking occurring in the bearing ring, and correctly determine the abnormality of the mechanical equipment.

(18) In the abnormality diagnosis apparatus of a rolling bearing according to (17), the control device is configured to acquire transition of a flaking length is acquired as an inclination from the gradation image, and estimate the flaking length after a predetermined time based on the inclination.

According to this configuration, the flaking length after the predetermined time can be evaluated, and the replacement timing of the bearing can be clearly grasped.

(19) An abnormality diagnosis method of a rolling bearing used in rotating machinery includes:

acquiring, from an output signal detected by a sensor during the rotation of the rolling bearing, an entry time when a rolling element enters a flaking region of a bearing ring;

forming a gradation image by drawing the output signal in a rotation cycle of a rotation ring in gradation with the entry time as an origin and repeating the drawing for each rotation cycle of the rotation ring; and outputting the gradation image.

According to this configuration, it is possible for an operator to quantitatively evaluate and visually recognize a progress of flaking occurring in the bearing ring from the gradation image, and clearly grasp a replacement timing of the bearing.

(20) The abnormality diagnosis method of a rolling bearing according to (19), the sensor is a vibration sensor configured to detect a vibration of the rolling bearing, and the acquiring the entry time includes:

setting a time indicating a maximum value of either one of negative and positive vibration velocities whose absolute value is larger than a threshold in the rotation cycle of the rotation ring in a vibration velocity waveform acquired from the output signal as the entry time.

According to this configuration, a change in a rolling element load can be grasped as a change in the vibration velocity by using the vibration sensor, and the entry time can be easily acquired from the vibration velocity waveform.

(21) The abnormality diagnosis method of a rolling bearing according to (19), the sensor is a vibration sensor configured to detect a vibration of the rolling bearing, and the acquiring the entry time includes:

setting a time indicating either one of a maximum value of a vibration velocity larger than a predetermined upper limit value and a minimum value of the vibration velocity smaller than a predetermined lower limit value in the rotation cycle of the rotation ring in a vibration velocity waveform acquired from the output signal as the entry time.

According to this configuration, the change in the rolling element load can be grasped as the change in the vibration velocity by using the vibration sensor, and the entry time can be easily acquired from the vibration velocity waveform.

(22) The abnormality diagnosis method of a rolling bearing according to (19), the sensor is a load sensor configured to detect a rolling bearing load, and the acquiring the entry time includes:

setting a time when the load decreases from a threshold in the rotation cycle of the rotation ring in a waveform representing the load as the entry time.

According to this configuration, the entry time can be easily acquired from the waveform representing the change in the rolling element load by using the load sensor.

(23) The abnormality diagnosis method of a rolling bearing according to any one of (19) to (22), further includes:

acquiring transition of a flaking length as an inclination from the gradation image; and estimating the flaking length after a predetermined time based on the inclination.

According to this configuration, the flaking length after the predetermined time can be evaluated, and the replacement timing of the bearing can be clearly grasped.

(24) An abnormality diagnosis apparatus of a rolling bearing used in rotating machinery includes:

a control device configured to acquire, from an output signal detected by a sensor during the rotation of the rolling bearing, an entry time when a rolling element enters a flaking region of a bearing ring, and form a gradation image by drawing the output signal in a rotation cycle of a rotation ring in gradation with the entry time as an origin and repeating the drawing for each rotation cycle of the rotation ring; and an outputting device configured to output the gradation image.

According to this configuration, it is possible for an operator to quantitatively evaluate a progress of flaking occurring in the bearing ring from the gradation image and clearly grasp a replacement timing of the bearing.

(25) The abnormality diagnosis apparatus of a rolling bearing according to (24), the sensor is a vibration sensor configured to detect a vibration of the rolling bearing, and the control device is configured to set, as the entry time, a time indicating a maximum value of either one of negative and positive vibration velocities whose absolute value is larger than a threshold in the rotation cycle of the rotation ring in a vibration velocity waveform acquired from the output signal.

According to this configuration, a change in the rolling element load can be grasped as a change in the vibration velocity by using the vibration sensor, and the entry time can be easily acquired from the vibration velocity waveform.

(26) The abnormality diagnosis apparatus of a rolling bearing according to (24), the sensor is a vibration sensor configured to detect a vibration of the rolling bearing, and the control device is configured to set, as the entry time, a time indicating either one of a maximum value of a vibration velocity larger than a predetermined upper limit value and a minimum value of the vibration velocity smaller than a predetermined lower limit value in the rotation cycle of the rotation ring in a vibration velocity waveform acquired from the output signal.

According to this configuration, the change in the rolling element load can be grasped as a change in the vibration velocity by using the vibration sensor, and the entry time can be easily acquired from the vibration velocity waveform.

(27) The abnormality diagnosis apparatus of a rolling bearing according to (24), the sensor is a load sensor configured to detect a rolling bearing load, and the control device is configured to set, as the entry time, a time when the load decreases below a threshold in the rotation cycle of the rotation ring in a waveform representing the load.

According to this configuration, the entry time can be easily acquired from the waveform representing the change in the rolling element load by using the load sensor.

(28) The abnormality diagnosis apparatus of a rolling bearing according to any one of (24) to (27), the control device is configured to acquire transition of a flaking length as an inclination from the gradation image, and estimate the flaking length after a predetermined time based on the inclination.

According to this configuration, the flaking length after the predetermined time can be evaluated, and the replacement timing of the bearing can be clearly grasped.

This application is based on a Japanese patent application (Japanese Patent Application No. 2018-156535) filed on Aug. 23, 2018, contents of which are incorporated herein by reference.

REFERENCE SIGNS LIST 1 abnormality diagnosis apparatus
10 mechanical equipment
11 rolling bearing
12 vibration sensor
20 control device
21 arithmetic processing unit
22 control unit
31 data transmission unit
40 piezoelectric force sensor (load sensor)
40a piezoelectric film (load sensor)
40b optical fiber (load sensor)

The invention claimed is:

1. An abnormality diagnosis method of a rolling bearing used in rotating machinery comprising:
   detecting, by a sensor, a rolling element load borne by the rolling bearing in the rotating machinery,
   acquiring, from an output signal detected by the sensor during a rotation of the rolling bearing, an entry time when the rolling element enters a flaking region of a bearing ring, and an escape time when the rolling element escapes from the flaking region of the bearing ring;
   estimating a flaking size based on a flaking passage time, which is a time difference between the entry time and the escape time,
   estimating a time for replacement of the rolling bearing based on the estimated flaking size, and
   controlling a rotation of the rotating machinery such that if the estimated time for replacement is below a threshold, the rotation of the rotating machinery is at least slowed and/or stopped, and such that if the estimated time for replacement is above the threshold, the rotation of the rotating machinery is continued.

2. The abnormality diagnosis method of a rolling bearing according to claim 1,
   wherein the sensor is a vibration sensor configured to detect a vibration of the rolling bearing, and
   wherein the acquiring the entry time and the escape time includes:
   setting a time at which vibration velocity is either one of negative and positive and whose absolute value is larger than a threshold and indicates a maximum value in a rotation cycle of a rotation ring in a vibration velocity waveform acquired from the output signal as the entry time; and
   setting a time indicating a maximum value of another of the negative and positive vibration velocities in a predetermined time from the entry time as the escape time.

3. The abnormality diagnosis method of a rolling bearing according to claim 1,
   wherein the sensor is a vibration sensor configured to detect a vibration of the rolling bearing, and
   wherein the acquiring the entry time and the escape time includes:
   setting a time indicating either one of a maximum value of a vibration velocity larger than a predetermined upper limit value and a minimum value of the vibration velocity smaller than a predetermined lower limit value in a rotation cycle of a rotation ring in a vibration velocity waveform acquired from the output signal as the entry time; and
   setting a time indicating another of the maximum value and the minimum value of the vibration velocity in a predetermined time from the entry time as the escape time.

4. The abnormality diagnosis method of a rolling bearing according to claim 1,
   wherein the sensor is a vibration sensor configured to detect a vibration of the rolling bearing,
   wherein the acquiring the entry time and the escape time includes:
   setting a time at which vibration velocity is either one of negative and positive vibration velocities whose absolute value is larger than a threshold and indicates a maximum value in a rotation cycle of a rotation ring in a vibration velocity waveform acquired from the output signal as the entry time; and
   acquiring the escape time from a gradation image formed by drawing the vibration velocity in gradation in the rotation cycle of the rotation ring with the entry time as an origin and repeating the drawing for each rotation cycle of the rotation ring.

5. The abnormality diagnosis method of a rolling bearing according to claim 4, further comprising:
   acquiring transition of a flaking length as an inclination from the gradation image; and
   estimating the flaking length after a predetermined time based on the inclination.

6. The abnormality diagnosis method of a rolling bearing according to claim 1,
wherein the sensor is a vibration sensor configured to detect a vibration of the rolling bearing,
wherein the acquiring the entry time and the escape time includes:
setting a time indicating either one of a maximum value of a vibration velocity larger than a predetermined upper limit value and a minimum value of the vibration velocity smaller than a predetermined lower limit value in a rotation cycle of a rotation ring in a vibration velocity waveform acquired from the output signal as the entry time, and
acquiring the escape time from a gradation image formed by drawing a vibration velocity in gradation in the rotation cycle of the rotation ring with the entry time as an origin and repeating the drawing for each rotation cycle of the rotation ring.

7. The abnormality diagnosis method of a rolling bearing according to claim 1,
wherein the sensor is a load sensor configured to detect a rolling bearing load, and
wherein the acquiring the entry time and the escape time includes:
setting a time when the rolling bearing load decreases below a threshold in a rotation cycle of a rotation ring in a waveform representing the rolling bearing load as the entry time; and
setting a time when the rolling bearing load increases above the threshold within a predetermined time from the entry time as the escape time.

8. The abnormality diagnosis method of a rolling bearing according to claim 1,
wherein the sensor is a load sensor configured to detect a rolling bearing load,
wherein the acquiring the entry time and the escape time includes:
setting a time when the rolling bearing load decreases below a threshold in a rotation cycle of a rotation ring in a waveform representing the rolling bearing load as the entry time; and
acquiring the escape time from a gradation image formed by drawing the rolling bearing load in gradation in the rotation cycle of the rotation ring with the entry time as an origin and repeating the drawing for each rotation cycle of the rotation ring.

9. The abnormality diagnosis method of a rolling bearing according to claim 8, further comprising:
acquiring transition of a flaking length as an inclination from the gradation image; and
estimating the flaking length after a predetermined time based on the inclination.

10. An abnormality diagnosis apparatus of a rolling bearing used in rotating machinery comprising:
a sensor configured to detect a rolling element load borne by the rolling bearing in the rotating machinery,
a control device configured to:
acquire, from an output signal detected by the sensor during the rotation of the rolling bearing, an entry time when the rolling element enters a flaking region of a bearing ring, and an escape time when the rolling element escapes from the flaking region of the bearing ring,
estimate a flaking size based on a flaking passage time, which is a time difference between the entry time and the escape time
estimate a time for replacement of the rolling bearing based on the estimated flaking size, and
control a rotation of the rotating machinery such that if the estimated time for replacement is below a threshold, the rotation of the rotating machinery is at least slowed and/or stopped, and such that if the estimated time for replacement is above the threshold, the rotation of the rotating machinery is continued.

11. The abnormality diagnosis apparatus of a rolling bearing according to claim 10,
wherein the sensor is a vibration sensor configured to detect a vibration of the rolling bearing, and
wherein the control device is configured to set, as the entry time, a time at which vibration velocity is either one of negative and positive and whose absolute value is larger than a threshold and indicates a maximum value in a rotation cycle of a rotation ring in a vibration velocity waveform obtained from the output signal, and set, as the escape time, a time indicating a maximum value of another of the negative and positive vibration velocities in a predetermined time from the entry time.

12. The abnormality diagnosis apparatus of a rolling bearing according to claim 10,
wherein the sensor is a vibration sensor configured to detect a vibration of the rolling bearing, and
wherein the control device is configured to set, as the entry time, a time indicating either one of a maximum value of a vibration velocity larger than a predetermined upper limit value and a minimum value of the vibration velocity smaller than a predetermined lower limit value in a rotation cycle of a rotation ring in a vibration velocity waveform acquired from the output signal, and set, as the escape time, a time indicating another of the maximum value and the minimum value of the vibration velocity in a predetermined time from the entry time.

13. The abnormality diagnosis apparatus of a rolling bearing according to claim 10,
wherein the sensor is a vibration sensor configured to detect a vibration of the rolling bearing,
wherein the control device is configured to set, as the entry time, a time at which vibration velocity is either one of negative and positive and whose absolute value is larger than a threshold and indicates a maximum value in a rotation cycle of a rotation ring in a vibration velocity waveform acquired from the output signal, and acquire the escape time from a gradation image formed by drawing a vibration velocity in gradation in the rotation cycle of the rotation ring with the entry time as an origin and repeating the drawing for each rotation cycle of the rotation ring.

14. The abnormality diagnosis apparatus of a rolling bearing according to claim 13,
wherein the control device is configured to acquire transition of a flaking length as an inclination from the gradation image, and estimate the flaking length after a predetermined time based on the inclination.

15. The abnormality diagnosis apparatus of a rolling bearing according to claim 10,
wherein the sensor is a vibration sensor configured to detect a vibration of the rolling bearing,
wherein the control device is configured to set, as the entry time, a time indicating either one of a maximum value of a vibration velocity larger than a predetermined upper limit value and a minimum value of the vibration velocity smaller than a predetermined lower limit value in a rotation cycle of a rotation ring in a vibration velocity waveform acquired from the output signal, and acquire the escape time from a gradation image formed by drawing the vibration velocity in gradation in the rotation cycle of the rotation ring with the entry time as an origin and repeating the drawing for each rotation cycle of the rotation ring.

16. The abnormality diagnosis apparatus of a rolling bearing according to claim 10,
   wherein the sensor is a load sensor configured to detect a rolling bearing load, and
   wherein the control device is configured to set, as the entry time, a time when the load decreases below a threshold in a rotation cycle of a rotation ring in a waveform representing the rolling bearing load, and set, as the escape time, a time when the load increases above the threshold within a predetermined time from the entry time.

17. The abnormality diagnosis apparatus of a rolling bearing according to claim 10,
   wherein the sensor is a load sensor configured to detect a rolling bearing load,
   wherein the control device is configured to set, as the entry time, a time when the rolling bearing load decreases below a threshold in the rotation cycle of the rotation ring in a waveform representing the load, and acquire the escape time from a gradation image formed by drawing the rolling bearing load in gradation in the rotation cycle of the rotation ring with the entry time as an origin and repeating the drawing for each rotation cycle of the rotation ring.

18. The abnormality diagnosis apparatus of a rolling bearing according to claim 17,
   wherein the control device is configured to acquire transition of a flaking length as an inclination from the gradation image, and estimate the flaking length after a predetermined time based on the inclination.

* * * * *